United States Patent
Evans et al.

(10) Patent No.: US 10,354,448 B1
(45) Date of Patent: Jul. 16, 2019

(54) DETECTION OF OPTICAL COMPONENTS IN A SCENE

(71) Applicant: Lockheed Martin Corporation, Bethesda, MD (US)

(72) Inventors: Bruno J. Evans, Keller, TX (US); Gary P. Perryman, Arlington, TX (US); Douglas E. Pasquan, McLean, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 297 days.

(21) Appl. No.: 13/999,334

(22) Filed: Feb. 11, 2014

Related U.S. Application Data

(60) Provisional application No. 61/790,969, filed on Mar. 15, 2013.

(51) Int. Cl.
  *G09G 5/10* (2006.01)
  *G06T 19/00* (2011.01)

(52) U.S. Cl.
  CPC ............. *G06T 19/006* (2013.01); *G09G 5/10* (2013.01)

(58) Field of Classification Search
  CPC ........................................................ G01S 17/89
  USPC ........................................................ 345/589
  See application file for complete search history.

(56) References Cited

U.S. PATENT DOCUMENTS

| | | | |
|---|---|---|---|
| 5,408,541 A | 4/1995 | Sewell | |
| 6,985,212 B2 | 1/2006 | Jamieson et al. | |
| 7,193,692 B2* | 3/2007 | Huang | G01S 7/487 356/5.01 |
| 7,379,164 B2 | 5/2008 | Inbar et al. | |
| 7,409,899 B1 | 8/2008 | Beekman | |
| 7,443,494 B1 | 10/2008 | Kuerbitz | |
| 7,456,944 B2 | 11/2008 | Haan et al. | |
| 7,697,125 B2 | 4/2010 | Swenson et al. | |
| 8,063,348 B1 | 11/2011 | Swaminathan et al. | |
| 8,194,126 B2 | 6/2012 | David et al. | |
| 2006/0228003 A1 | 10/2006 | Silverstein | |
| 2007/0268485 A1* | 11/2007 | Polonskiy | A61B 5/0059 356/300 |
| 2008/0278715 A1 | 11/2008 | Swenson et al. | |

(Continued)

FOREIGN PATENT DOCUMENTS

| | | |
|---|---|---|
| JP | 10300840 A | 11/1998 |
| WO | 2011107987 A1 | 9/2011 |
| WO | 2012095136 A1 | 7/2012 |

OTHER PUBLICATIONS

Author Unknown, "LAS 100," Newcon Optik, 1991-2014, retrieved from http://www.newcon-optik.com/las1000.html, 1 page.

(Continued)

*Primary Examiner* — Shivang I Patel
(74) *Attorney, Agent, or Firm* — Withrow & Terranova, PLLC

(57) ABSTRACT

Methods and systems for detecting optical components are disclosed. An optical signal comprising a plurality of light pulses is transmitted by a laser into a field of view (FOV) of a detector at a pulse repetition rate. A scene within the FOV is depicted to an eyepiece. The detector receives a plurality of reflected light pulses of the optical signal from a location within the scene during a first integration time period of the detector. At least one element of a display that is registered to the FOV is altered based on the plurality of reflected light pulses.

25 Claims, 9 Drawing Sheets

(56) References Cited

U.S. PATENT DOCUMENTS

| | | | | |
|---|---|---|---|---|
| 2010/0085556 A1* | 4/2010 | Bedwell | ............... | G01C 15/002 356/4.02 |
| 2010/0128992 A1* | 5/2010 | Duvent | ................... | G01S 7/487 382/218 |
| 2010/0194574 A1* | 8/2010 | Monk | ..................... | G01N 21/53 340/627 |
| 2011/0255070 A1* | 10/2011 | Phillips | ................ | G01S 7/4813 356/4.01 |
| 2012/0046100 A1* | 2/2012 | Roman | .................. | F41G 1/467 463/30 |
| 2012/0176593 A1* | 7/2012 | Frucht | .................. | G01S 7/4865 356/4.01 |
| 2013/0131836 A1* | 5/2013 | Katz | ..................... | H04N 21/422 700/12 |
| 2013/0228691 A1* | 9/2013 | Shah | ................. | H01L 27/14614 250/341.8 |

OTHER PUBLICATIONS

Author Unknown, "Optics Detectors SLD 500—surveillance and sniper detection laser system," Cilas, retrieved Oct. 29, 2014 from http://www.cilas.com/optics-detectors-sld500.htm, 2 pages.

Bentell, J. et al., "Flip Chipped InGaAs Photodiode Arrays for Gated Imaging With Eye-Safe Lasers," International Solid-State Sensors, Actuators and Microsystems Conference, Jun. 10-14, 2007, Lyon, France, IEEE, pp. 1103-1106.

Scanlon, Michael V. et al., "Sensor and Information Fusion for Improved Hostile Fire Situational Awareness," Proceedings of SPIE, vol. 7693, Unattended Ground, Sea, and Air Sensor Technologies and Applications XII, May 19, 2010, SPIE, 20 pages.

Geng, Yang et al., "Sniper detector based on cat eye effect," Journal of Applied Optics, vol. 31, No. 5, Sep. 2010, http://caod.oriprobe.com/articles/24897432/Sniper_detector_based_on_cat_eye_effect.htm, 8 pages.

* cited by examiner

DETECTION OF OPTICAL COMPONENTS IN A SCENE

RELATED APPLICATIONS

This application claims the benefit of provisional patent application Ser. No 61/790,969, filed Mar. 15, 2013, entitled "OPTICS DETECTION FOR COUNTER SNIPER SYSTEM AND OTHER APPLICATIONS," the disclosure of which is hereby incorporated herein by reference in its entirety.

TECHNICAL FIELD

The embodiments relate generally to methods and systems for detecting optical components in a scene.

BACKGROUND

Optical components utilized in devices such as a rifle scope, a spotting scope, a camera lens, binoculars, telescopes, night vision glasses, and the like are used to collect energy, typically in the form of electromagnetic energy, emitted or reflected from a scene. In some contexts, such as security or military contexts, adversaries may use such devices for nefarious purposes. For example, a sniper using a high-powered rifle equipped with a scope can kill or maim individuals at long range.

Some detection devices exist for detecting optical components in a scene, but typically such devices have limited range due to energy-aperture limitations, do not allow clear distinction between background scenery and an optical component due to low contrast, or utilize a wavelength transmitted through the optical component which all result in reducing the detection device's ability to detect the optical components.

SUMMARY

The disclosed embodiments relate to methods and systems for detecting optical components, such as a lens and other reflective surfaces utilized in a device such as a rifle scope, night vision glasses, a spotting scope, binoculars, telescopes, camera lenses, and the like.

In one embodiment, a method for detecting an optical component is provided. A laser transmits an optical signal comprising a plurality of light pulses into a field of view (FOV) of a detector at a pulse repetition rate. A scene within the FOV of the detector is depicted to an eyepiece. The detector receives a first plurality of reflected light pulses of the optical signal from a location within the scene during a first integration time period of the detector. A controller alters at least one element of a display that is registered to the FOV based on the first plurality of reflected light pulses.

In one embodiment, the scene is depicted to the eyepiece via the display. In another embodiment, the scene is depicted to the eyepiece via a beam splitter element that transmits energy received from the scene toward the eyepiece. Light from the at least one element of the display is reflected by the beam splitter element in a direction along an optical path toward the eyepiece.

In one embodiment, the laser is scanned across the FOV while concurrently transmitting the optical signal into the FOV. In one embodiment, the FOV is divided into a plurality of swaths. For each swath of the plurality of swaths the laser is oriented at an initial location of the swath, and the laser is scanned across the swath. The laser is then stepped to the next swath.

In one embodiment, a second plurality of reflected light pulses are received from the location within the scene during a second integration time period of the detector. The at least one element of the display is successively altered based on the first plurality of reflected light pulses and the second plurality of reflected light pulses. In one embodiment, the first integration time period has a first time duration and the second integration time period has a second time duration that is different from the first time duration.

In another embodiment a system for providing an optical component is provided. The system includes a laser configured to transmit an optical signal comprising a plurality of light pulses into a FOV of a detector at a pulse repetition rate. A relay element is configured to depict a scene within the FOV to an eyepiece. A detector is configured to receive a first plurality of reflected light pulses of the optical signal from a location within the scene during a first integration time period. A controller is configured to receive a first output signal from the detector based on the first plurality of light pulses, and to alter at least one element of a display that is registered to the FOV based on the first plurality of light pulses.

In one embodiment, the relay element comprises the display, and the display depicts imagery of the scene. In another embodiment, the relay element comprises a beam splitter element that is communicatively coupled to the display. The beam splitter element is configured to transmit energy received from an objective lens along an optical path toward the eyepiece, and to reflect light received from the display along the optical path toward the eyepiece.

In another embodiment, a rifle scope is provided. The rifle scope includes a laser configured to transmit an optical signal comprising a plurality of light pulses into a FOV of a detector at a pulse repetition rate. A relay element is configured to depict a scene within the FOV to an eyepiece. A detector is configured to receive a first plurality of reflected light pulses of the optical signal from a location within the scene during a first integration time period. The rifle scope includes a controller that is configured to receive a first output signal from the detector based on the first plurality of light pulses, and to alter at least one element of a display that is registered to the FOV based on the first plurality of light pulses.

Those skilled in the art will appreciate the scope of the present disclosure and realize additional aspects thereof after reading the following detailed description of the preferred embodiments in association with the accompanying drawing figures.

BRIEF DESCRIPTION OF DRAWINGS

The accompanying drawing figures incorporated in and forming a part of this specification illustrate several aspects of the disclosure, and together with the description serve to explain the principles of the disclosure.

DETAILED DESCRIPTION

Figure 1:
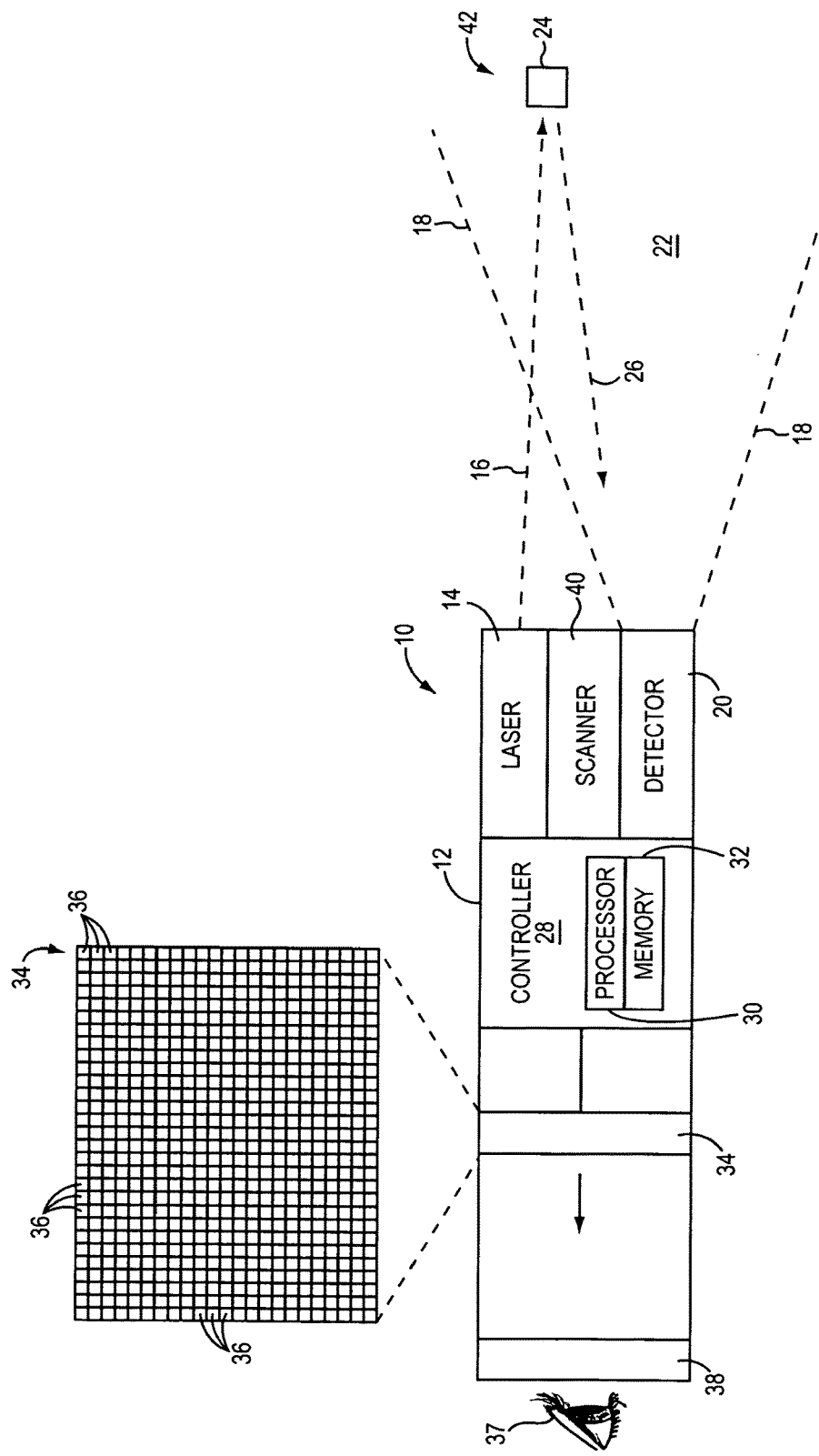
FIG. 1 is a block diagram of a detection system according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first plurality" and "second plurality," and does not imply a priority, a type, an importance, or other attribute, unless otherwise stated herein.

The disclosed embodiments relate to methods and system for detecting optical components used in devices such as a rifle scope, a camera lens, a spotting scope, binoculars, telescopes, night vision glasses and the like. In some embodiments, a relatively high pulse rate laser is used to transmit a plurality of light pulses into a field of view (FOV) of a detector. The pulse rate may be substantially in excess of a frame time period of the detector, such that hundreds or thousands of pulses may be emitted by the laser for each frame generated by the detector. The energy of each laser pulse may be relatively low, such as, in some embodiments in a range between about 4 microjoules and about 25 microjoules, although the embodiments are not limited to any particular laser pulse energy. Reflections of light pulses from optical components in the scene result in a series of reflected light pulses from the location of the optical component in the scene. The reflected light pulses can be used to alter an element of a display that is registered to the FOV of the detector to highlight the location of the optical component to a user.

In some embodiments, because the energy of the individual laser pulses is relatively low, the energy of the reflected laser pulses is similarly relatively low, and thereby the intensity of the return is relatively low, resulting in a relatively high resolution of the optical component with respect to background scenery. This is preferable to a high-energy laser that results in a return that reflects off of background objects surrounding the optical component, resulting in a correspondingly large spot on the display that reduces overall contrast of the scene and reduces the resolution of the optical component with respect to the background scenery. Thus, the use of laser pulses with relatively low energy, as described herein, facilitates detection of the optical components even when relatively close to one another.

FIG. 1 is a block diagram of a detection system 10 according to one embodiment. The detection system 10 includes a housing 12 that houses a laser 14 that is configured to transmit an optical signal 16 comprising a plurality of light pulses into a field of view (FOV) 18 of a detector 20 at a pulse repetition rate. The phrase "light" as used herein is not limited to electromagnetic radiation in the visible spectrum. The detector 20 comprises a grid, or array, of detector elements sensitive to electromagnetic radiation in the wavelengths of the optical signal 16, and in some embodiments, also sensitive to other wavelengths of electromagnetic radiation, such as those in the visible spectrum. The FOV 18 encompasses a real-world scene 22. An optical component 24 may be located in the scene 22. The optical component 24 may comprise, for example, an objective lens or other element utilized in a device (not illustrated), such as a rifle scope, a pair of binoculars, a spotting scope, or a still or video camera, that is engineered to pass electromagnetic radiation from the real-world scene into the respective device.

When the optical signal 16 impacts the optical component 24, some or all of the light pulses are reflected in a laser return signal 26 comprising a plurality of reflected light pulses. The detector 20 receives the laser return signal 26, and outputs an electrical signal based on the reflected light pulses in the laser return signal 26 to a controller 28. The controller 28 includes a processor 30 and a memory 32, and renders imagery for presentation on a display 34 based on the output of the detector 20. In particular, during each frame time period of the detector 20, the detector 20 provides an output signal to the controller 28 based on the electromagnetic energy, including the laser return signal 26, received by the detector 20 during the frame time period.

The display 34 is registered to the FOV 18 of the detector 20, and comprises a plurality of elements 36 that correspond to elements of the detector 20. The controller 28 thus, based on the laser return signal 26, alters at least one element 36 of the display 34 based on the plurality of reflected light pulses in the laser return signal 26. The scene 22 is depicted on the display 34 to a user 37 via an eyepiece 38 in the housing 12. The display 34 may be a liquid crystal display (LCD), a light emitting diode (LED) display, or any other suitable type of display. The detection system 10 may be packaged in any of a variety of different configurations or form factors, including, for example, a rifle scope, binoculars, a spotting scope, a stationary device that automatically scans a large area, and the like. In some embodiments, a scanner 40 is coupled to the laser 14, and scans the laser 14 across the FOV 18 of the detector 20, as discussed in greater detail herein.

Figure 2:
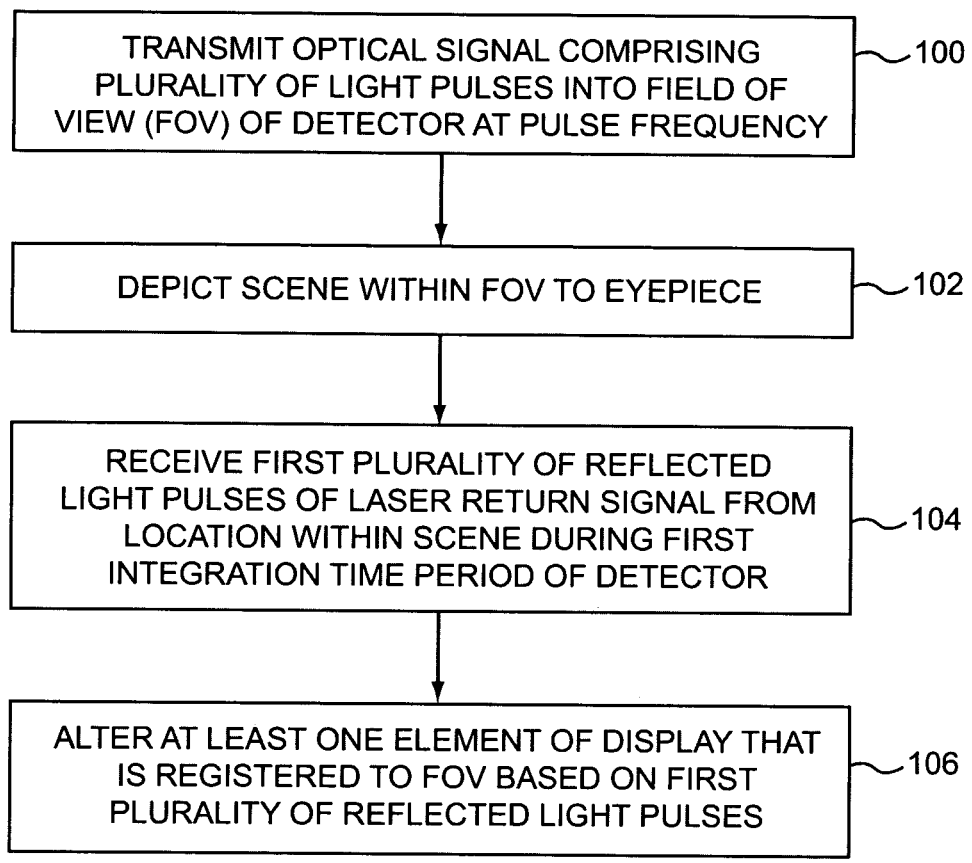
FIG. 2 is a flowchart of a method for detecting an optical component according to one embodiment.

FIG. 2 is a flowchart of a method for detecting an optical component according to one embodiment. FIG. 2 will be discussed in conjunction with FIG. 1. The laser 14 transmits the optical signal 16 as a plurality of light pulses into the FOV 18 of the detector 20 at a pulse repetition rate (FIG. 2, block 100). In one embodiment, the laser 14 is a pulsed laser that emits a pulsed laser optical signal. The pulse repetition rate of the laser 14 may be relatively high, such as between about 10 kilohertz and 200 kilohertz. In some embodiments, the pulse repetition rate is about 150 kilohertz, but the embodiments are not limited to any particular pulse repetition rate, as long as the pulse repetition rate is sufficiently high enough to generate a plurality of light pulses during an integration time period of the detector 20. The phrase "about," as used herein in conjunction with a numeric value, means within 10% of the numeric value.

In some embodiments the optical signal 16 is out-of-band with respect to visible wavelengths and near-infrared (NIR) wavelengths that are in the range of about 400 nanometers (nm) to about 1000 nm, which may be the wavelengths of interest of conventional optical components 24, including those of night vision glasses.

In some embodiments, the optical signal 16 comprises a wavelength between about 1200 nm and about 2000 nm. In one embodiment, the optical signal 16 has a wavelength of about 1600 nm. Conventional optical components 24 utilize the visible spectrum, or in the case of night vision glasses, the NIR spectrum up to about 1000 nm, for operation. If the optical signal 16 is within the same range of wavelengths as such devices, the optical signal 16 is not strongly reflected off the optical component 24 because the optical component 24 is designed to pass such wavelengths into the respective device in order to operate effectively. Accordingly, energy emitted by conventional optical component detectors that utilize the visible or NIR spectrum for operation may pass through the optical component 24 and reflect, if at all, off an interior component, such as a focal plane array or reticule, that is in an optical path behind the optical component 24. Unfortunately, if nothing within the housing of the device causes sufficient reflection, conventional optical detectors cannot detect the existence of the optical component 24. The present embodiments, among other advantages, by utilizing out-of-band energy such as in the wavelengths of about 1200 nm to about 1600 nm, reflect off the optical component 24 itself and obtain relatively high specular reflection. The inventors named herein have also determined that many anti-reflective coatings used on conventional optical components 24 are relatively highly reflective to light having wavelengths of about 1400 nm to about 1600 nm. The use of such wavelengths can result in substantial laser returns at relatively low energy levels. This not only maintains the original contrast of the scene 22, but allows for finer resolution for detection of the optical components 24 that may be located relatively close, in a horizontal or vertical direction, to one another. Moreover, the use of wavelengths that differ from those utilized by the optical component 24 prevents the user of the device that incorporates the optical component 24 from seeing the optical signal 16. Stated differently, use of an optical signal 16 that is of the same wavelength as that used by the optical component 24 would facilitate detection of the detection system 10 by the user of the device that incorporates the optical component 24.

In some embodiments, the energy level of each light pulse in the optical signal 16 is relatively low, such as between about 5 microjoules and about 50 microjoules. The relatively low energy results in an eye-safer laser, and also results in a relatively low energy level of the laser return signal 26, as discussed in greater detail below. In some embodiments, the laser 14 may include a polarizer to polarize the optical signal 16.

The scene 22 within the FOV 18 is depicted to the eyepiece 38 (FIG. 2, block 102). The scene 22 may be depicted, in one embodiment, via the display 34. In other embodiments, the scene 22 may be depicted to the eyepiece 38 via an optical component such as a beam splitter element, as will be discussed in greater detail herein.

As discussed above, the detector 20 contains detector elements that are sensitive to the wavelength of the optical signal 16, and receives a first plurality of reflected light pulses of the laser return signal 26 reflected by the optical component 24 at a location 42 in the scene 22 during a first integration time period of the detector 20 (FIG. 2, block 104). The controller 28 alters at least one element 36 of the display 34, which is registered to the FOV 18 of the detector 20, based on the first plurality of reflected light pulses received during the first integration time period of the detector 20 (FIG. 2, block 106). In one embodiment, the controller 28 may alter an intensity of the at least one element 36, such that the at least one element 36 is depicted on the display 34 having a substantially greater intensity than any other element 36. This facilitates relatively easy identification of the location 42 of the optical component 24 with respect to the scene 22 depicted on the display 34 by the user 37 viewing the display 34 through the eyepiece 38. As previously discussed, in one embodiment, the energy of the laser pulses of the optical signal 16 are relatively low, such as between about 5 microjoules and 50 microjoules, and thereby result in a relatively low intensity return detected by the detector elements of the detector 20.

Figure 3:
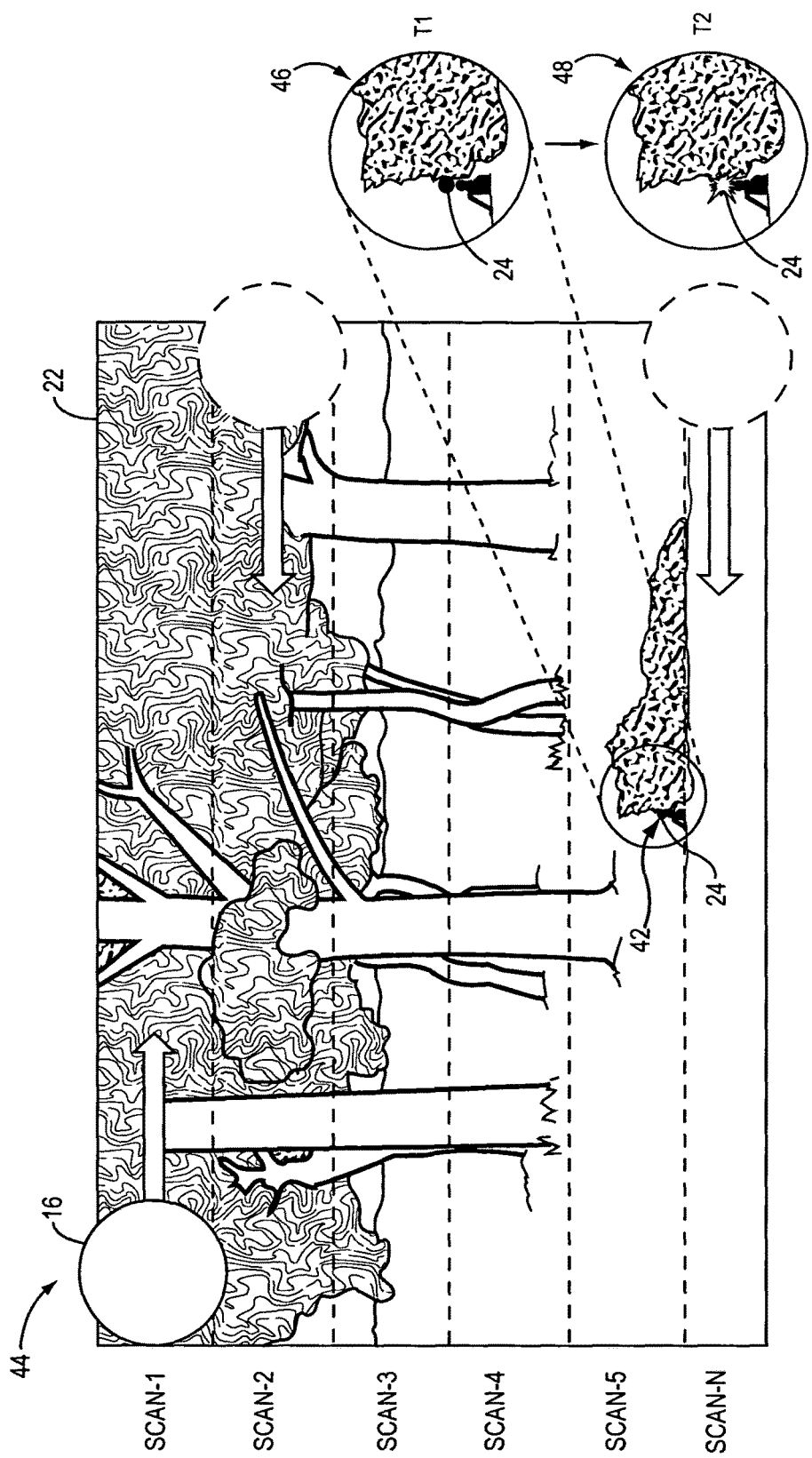
FIG. 3 is a diagram illustrating the use of a scanner according to one embodiment.

In one embodiment, a scanner 40 operates to scan the optical signal 16 across the FOV 18. The scanner 40 may comprise, for example, a rotating prism or a mirror that reflects the optical signal 16 across the FOV 18 at a desired scan rate. Alternatively, the scanner 40 may physically move the laser 14 to thereby cause the optical signal 16 to move across the scene 22 in the FOV 18. In this regard, FIG. 3 is a diagram illustrating the use of the scanner 40 according to one embodiment. FIG. 3 will be discussed in conjunction with FIG. 1. In this embodiment, the scanner 40 is illustrated as implementing a horizontal scan that is vertically stepped, but in alternative embodiments, the scanner 40 may implement a vertical scan that is horizontally stepped. A plurality of swaths Scan-1-Scan-N indicate the necessary number of passes of the optical signal 16 across the scene 22 to completely scan the scene 22 according to one embodiment. The number of passes may differ based on a number of different criteria, including characteristics of the optical signal 16, the size of the FOV 18, and the like.

The scanner 40, at the beginning of each scan cycle, orients the optical signal 16 at a starting location 44, and scans the optical signal 16 across swath Scan-1, concurrently while the laser 14 is generating the optical signal 16, which comprises a plurality of light pulses based on the pulse rate of the laser 14. At the end of swath Scan-1, the scanner 40 vertically steps the optical signal 16 to swath Scan-2, and scans the optical signal 16 across swath Scan-2. This process is repeated through swath Scan-N, and then the scanner 40 re-orients the optical signal 16 to the starting location 44, and repeats the process.

The scan cycle time of the scanner 40 comprises the duration of time required to scan the entire FOV 18. In some embodiments, the scan cycle time is based in part on a frame time period of the detector 20, which defines the period of time that the detector 20 generates a frame of data for presentation on the display 34. In some embodiments, the scan cycle time of the scanner 40 is set such that the detector 20 generates multiple frames of the scene 22 over a single scan cycle time. In these embodiments, the optical component 24 may not reflect the optical signal 16 during some of the frame time periods of the detector 20, because the optical signal 16 is not impacting the optical component 24 during such frame time periods. The optical component 24 does generate the laser return signal 26 during other frame time periods of the detector 20 when the optical signal 16 is impacting the optical component 24.

For example, assume that the scan cycle time is set to a rate such that the detector 20 generates a frame for every two swaths of the optical signal 16 across the scene 22. In this example, assuming six swaths are scanned per scan cycle, the optical component 24 will not reflect the optical signal 16 during the generation of two frames by the detector 20 (swaths Scan-1-Scan-4). The optical component 24 may, during those two frames, be depicted on the display 34 as illustrated in inset 46 at a time T1. The optical component 24 may therefore be invisible with respect to the background of the scene 22 to the user 37 peering into the eyepiece 38 during that period of time. During the integration time period covering swaths Scan-5-Scan-N, the optical component 24 reflects the optical signal 16 to generate the laser return signal 26, which is detected by the detector 20. Based on the laser return signal 26, the controller 28 alters the at least one elements 36 of the display 34 based on the laser return signal 26. The optical component 24 may, during those two frames, be depicted on the display 34 as illustrated, for example, in inset 48 at a time T2. Thus, during that time period, the user 37 peering into the eyepiece 38 may easily perceive the optical component 24. The overall effect to the user 37, in this embodiment, may be a continual toggling between the image that appears in inset 46 and that which appears in inset 48, thus, causing the optical component 24 to twinkle or blink, further highlighting the location 42 of the optical component 24 in the scene 22.

Figure 4:
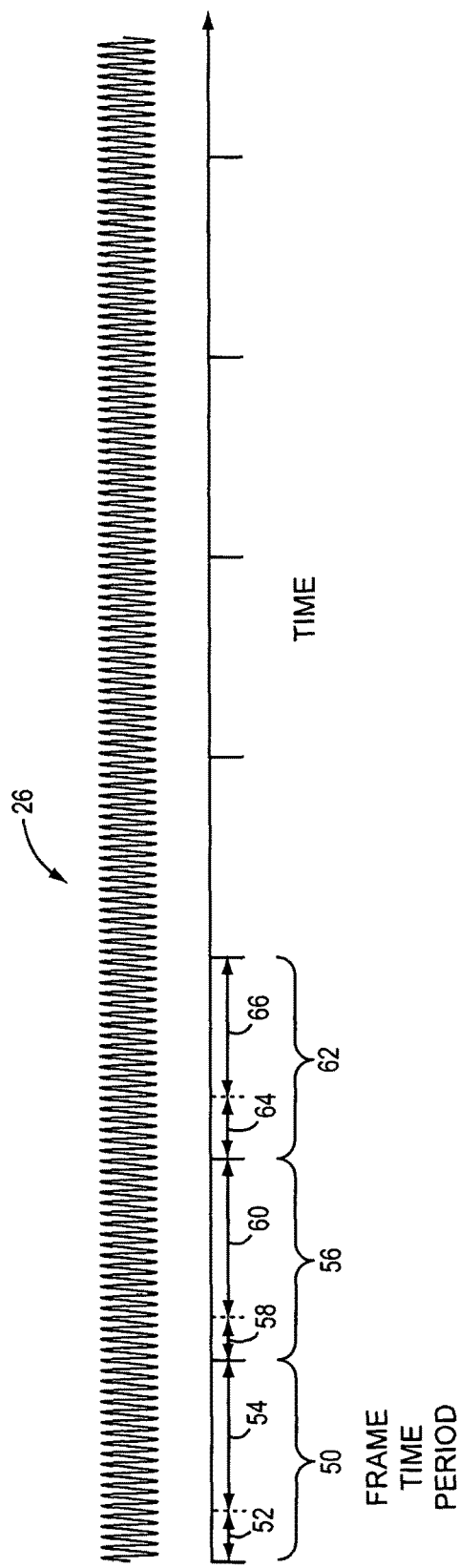
FIG. 4 is a diagram illustrating a relationship between a laser return signal and integration time periods of a detector, according to one embodiment.

FIG. 4 is a diagram illustrating a relationship between the laser return signal 26 and the integration time periods of the detector 20, according to one embodiment. In this embodiment, the detector 20 implements integration time periods of varying lengths, such that different numbers of reflected light pulses in the laser return signal 26 are captured for successive frames generated by the detector 20. For example, assume that the detector 20 is designed to implement a total frame time period of 33 milliseconds (ms) for a frame rate of approximately 30 frames per second. It should be noted, however, that the detector 20 is not limited to any particular frame rate, and in some embodiments, may have a frame rate of 60 frames per second, or may have any other suitable frame rate. A first frame time period 50 comprises an integration time period 52 of 10 ms and a processing time period 54 of 23 ms. A second frame time period 56 comprises an integration time period 58 of 6 ms and a processing time period 60 of 27 ms. A third frame time period 62 comprises an integration time period 64 of 14 ms and a processing time period 66 of 19 ms.

Assume that the controller 28 alters the intensity of elements 36 of the display 34 that correspond to the location 42 of the origination of the laser return signal 26 based on the number of reflected light pulses in the laser return signal 26 integrated during an integration time period of the detector 20. Assume further, for purposes of illustration, that the laser 14 has a pulse rate of 50 kilohertz. During the integration time period 52, the detector 20 may integrate about 500 (50,000*(10/1000)) reflected laser pulses of the laser return signal 26. During the integration time period 58, the detector 20 may integrate about 300 (50,000*(6/1000)) reflected laser pulses of the laser return signal 26. During the integration time period 64, the detector 20 may integrate about 700 (50,000*(14/1000)) reflected laser pulses of the laser return signal 26. In this example, the controller 28 alters the intensity of elements 36 of the display 34 in proportion to the number of reflected light pulses in the laser return signal 26 integrated during each integration time period of the detector 20. Thus, over the frame time periods 50, 56 and 62, the controller 28 causes the intensity of the corresponding elements 36 to vary substantially, resulting in a twinkling effect that is easily perceived by the user 37 peering into the eyepiece 38.

In some embodiments, the controller 28 implements a transmitting mode and a non-transmitting mode. The controller 28 iteratively places the laser 14 in a non-transmitting mode for a period of time during which the optical signal 16 is not transmitted, and in a transmitting mode for a successive period of time during which the optical signal 16 is transmitted, while concurrently depicting the scene 22 within the FOV 18 to the eyepiece 38. This is another mechanism for causing the elements 36 that correspond to the location 42 of the optical component 24 to vary greatly in intensity, and thus to draw the eyes of the user 37 of the detection system 10 to the location 42 as such elements 36 increase in intensity when in transmitting mode, and decrease in intensity when in non-transmitting mode.

Figure 5:
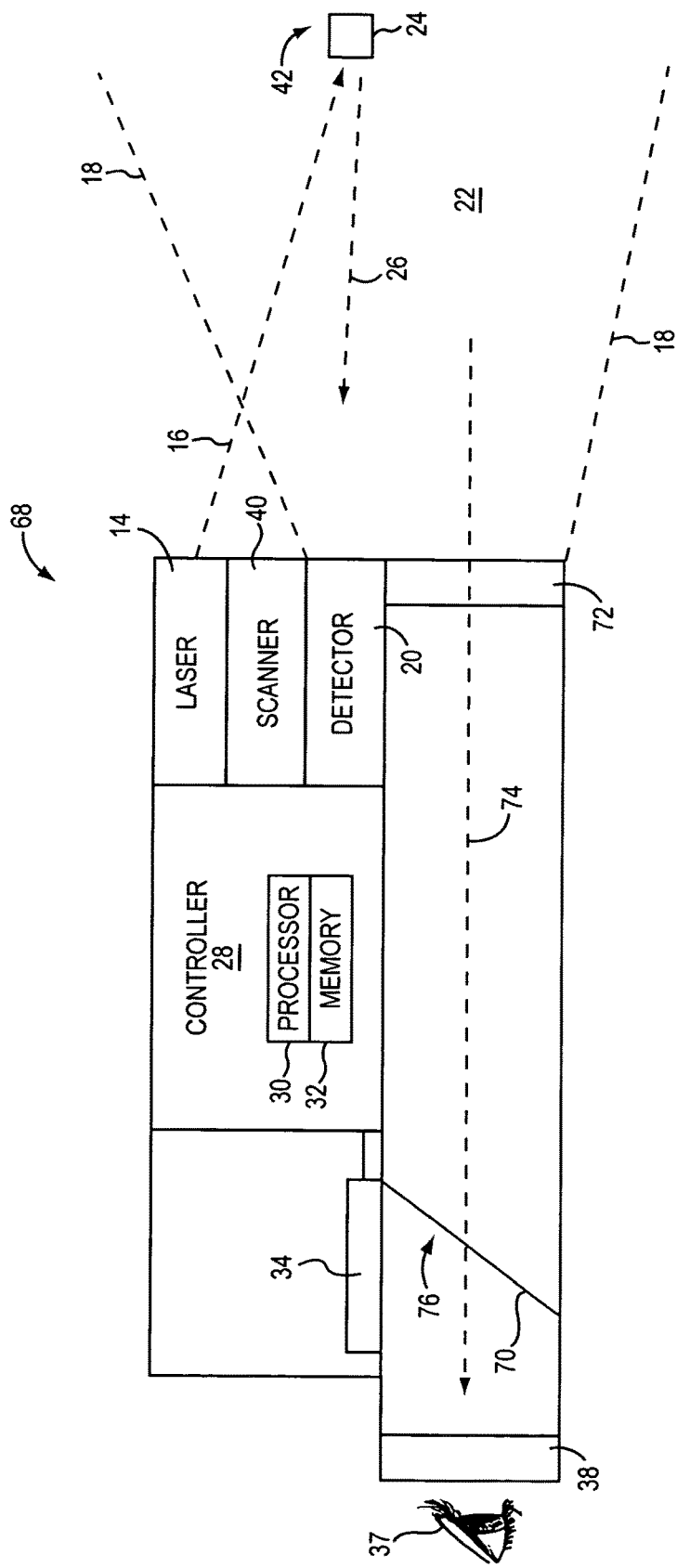
FIG. 5 is a block diagram of a detection system according to another embodiment.

FIG. 5 is a block diagram of a detection system 68 according to another embodiment. In this embodiment, the detection system 68 comprises a "see-through" device wherein a beam splitter element 70 passes the energy received via an objective lens 72 from the scene 22 to the eyepiece 38 along an optical path 74. It will be appreciated that additional lenses may be disposed in the optical path 74 for focusing, filtering, and other purposes, as suitable or appropriate for the particular application. The laser 14 transmits the optical signal 16 comprising a plurality of light pulses into the FOV 18 of the detector 20. Preferably, the detector 20 is registered to the FOV of the objective lens 72, so that both the FOV 18 of the detector 20 and the FOV of the objective lens 72 is substantially similar.

The laser return signal 26 is reflected by the optical component 24 at the location 42. The controller 28 determines the location 42 as the origination of the laser return signal 26 based on which particular detector elements of the detector 20 received the laser return signal 26. This may be determined by the controller 28, for example, by detecting a wide variation in electrical output of certain detector elements of the detector 20 with respect to other detector elements of the detector 20. The controller 28 renders an image for presentation on the display 34. The controller 28 determines at least one element 36 of the display 34 based on the location 42, and alters the at least one element 36 of the display 34. For example, the controller 28 may render an image of a brightly colored dot, such as a red dot, on the display 34. The image rendered on the display 34 reflects off a surface 76 of the beam splitter element 70 along the optical path 74 toward the eyepiece 38, wherein the image can be perceived by the user 37. Because the display 34 is registered to the FOV 18 of the detector 20, the location of the red dot perceived by the user 37 is aligned with the location 42 of the scene 22 received via the objective lens 72. In this manner, the user 37 can quickly be drawn to the location 42 of the optical component 24.

Figure 6:
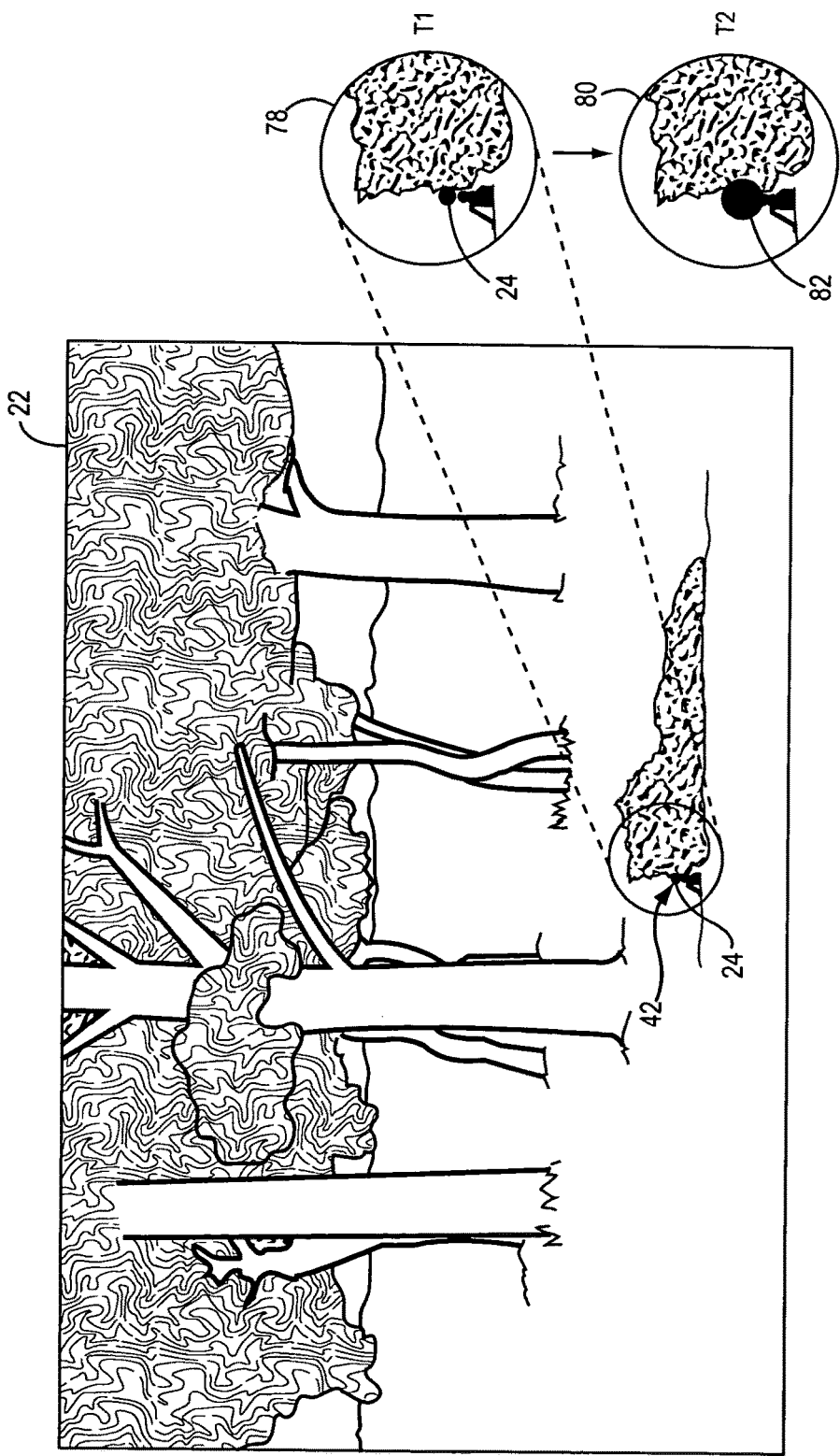
FIG. 6 is a diagram illustrating the rendering of an image by the detection system according to one embodiment.

FIG. 6 is a diagram illustrating the rendering of an image by the detection system 68 according to one embodiment. The user 37 perceives the scene 22 via the eyepiece 38. For purposes of illustration, an inset 78 illustrates an enlarged portion of the scene 22 that includes the optical component 24 which the user 37 may see via the eyepiece 38 at a time T1 when the optical signal 16 is not directed at the optical component 24. The optical component 24 may not be perceivable to the user 37 because the optical component 24 may not be distinguishable from the background of the scene 22. An inset 80 illustrates the same portion of the scene 22 which the user 37 may see via the eyepiece 38 at a time T2 when the optical signal 16 is directed at the optical component 24, and the detector 20 receives the laser return signal 26. In this embodiment, the controller 28 has generated an image 82 of a solid circle which is substantially larger than the diameter of the optical component 24, and which may comprise a distinctive color, such as red, yellow, or the like, to quickly draw an eye of the user 37 to the location 42. In particular, the controller 28, based on the location 42 identified by the laser return signal 26, may render the image 82, and present the image 82 to the plurality of elements 36 of the display 34. The image 82 is reflected off the surface 76 along the optical path 74 toward the eyepiece 38.

Figure 7:
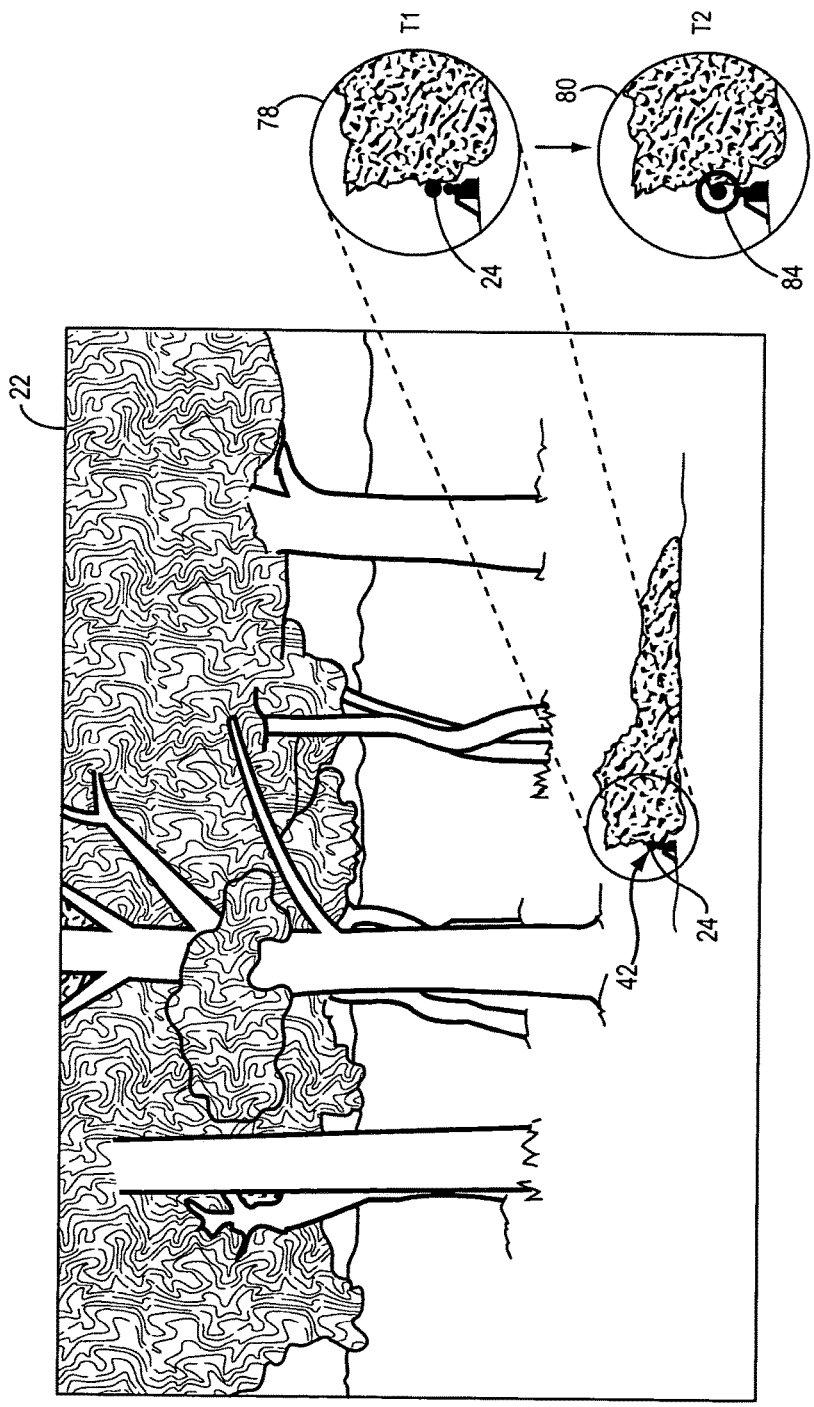
FIG. 7 is a diagram illustrating the rendering of an image by the detection system according to another embodiment.

FIG. 7 is a diagram illustrating the rendering of an image by the detection system 68 according to another embodiment. This embodiment may be similar to that discussed above with regard to FIG. 6, except the controller 28 has generated an image 84 of a distinctly colored ring to quickly draw the eye of the user 37 to the location 42.

Figure 8A:
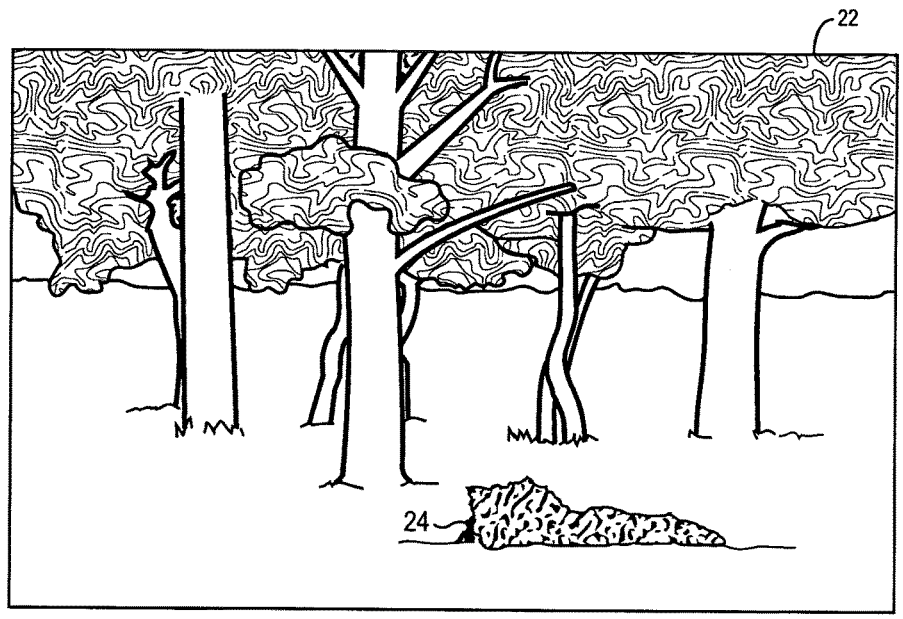
FIGS. 8A-8B are diagrams illustrating the rendering of an image by the detection system according to another embodiment.
Figure 8B:
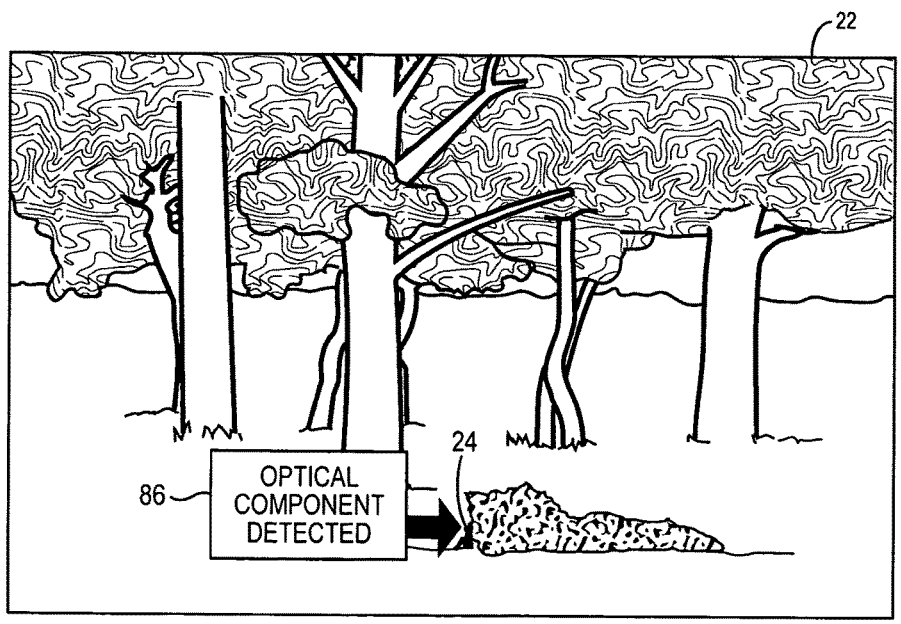

FIGS. 8A-8B are diagrams illustrating the rendering of an image by the detection system 68 according to another embodiment. This embodiment may be similar to that discussed above with regard to FIG. 6, except at the time T2, the controller 28 has generated an image 86 of text and an arrow identifying the optical component 24 in the scene 22.

While FIGS. 6-8B have been discussed in conjunction with the detection system 68, the detection system 10 discussed with regard to FIGS. 1-3 may similarly detect the laser return signal 26 separately from the other electromagnetic radiation being received from the scene 22 based, for example, on the differences in the electrical output of those detector elements of the detector 20 that receive the laser return signal 26 with respect to the remaining detector elements. The controller 28 may generate imagery, such as that discussed above with regard to FIGS. 6-8B, and superimpose such imagery onto the imagery that depicts the rest of the scene 22, such that the eye of the user 37 is rapidly drawn to the location 42.

Figure 9:
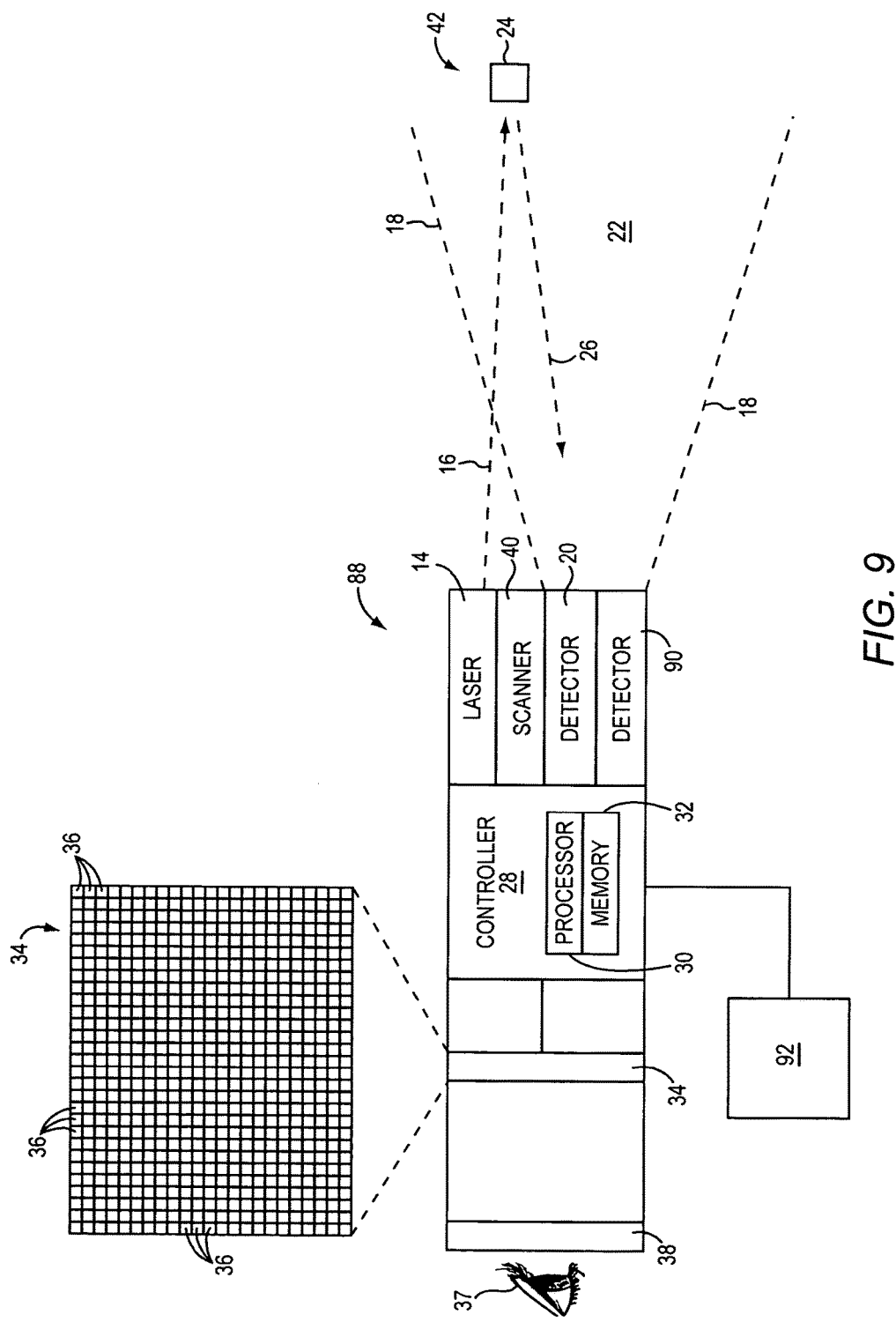
FIG. 9 is a block diagram of the detection system according to another embodiment.

FIG. 9 is a block diagram of a detection system 88 according to another embodiment. In this embodiment, the detection system 88 includes an additional detector 90 that is coupled to the controller 28. In this embodiment, the detector 90 may operate in a band that differs from that of the detector 20. For example, the detector 20 may operate in a short wave infrared (SWIR) band of light, while the detector 90 operates in a visible-to-near infrared (VNIR) band of light, or a long wave infrared (LWIR) band of light. The controller 28 may operate to fuse image data received from both the detector 20 and the detector 90, and provide such fused image data to the display 34 for presentation to the user 37. In this embodiment, a second display 92 is located remote from the detection system 88. The controller 28 may provide imagery to the display 34 and the second display 92 concurrently, via a wired or wireless communication link.

The embodiments disclosed herein may be implemented in any of several different configurations, including, by way of non-limiting example, a rifle scope, a spotting scope, a camera, binoculars, a telescope, or a stationary device that repeatedly scans a relatively large area.

Those skilled in the art will recognize improvements and modifications to the preferred embodiments of the present disclosure. All such improvements and modifications are considered within the scope of the concepts disclosed herein and the claims that follow.

What is claimed is:

1. A method for detecting an optical component comprising:
    transmitting, by a laser, an optical signal comprising a plurality of light pulses into a field of view (FOV) of a detector at a pulse repetition rate, the detector comprising a grid of a plurality of detector elements;
    depicting a scene within the FOV to a display that is registered to the FOV;
    integrating, by at least one detector element of the detector, a first plurality of reflected light pulses of the optical signal from the optical component from a location within the scene for each of a plurality of successive first integration time periods of the detector; and
    altering an intensity of at least one element of the display that corresponds to the at least one detector element of the detector to different intensity levels for each respective successive first integration time period of the plurality of successive first integration time periods based on a quantity of reflected light pulses received during the respective successive first integration time period to thereby identify the location within the scene as a location of the optical component.

2. The method of claim 1, further comprising identifying, on the display, the scene and the location within the scene that corresponds to the at least one detector element as the location of the optical component by:
    determining, based on the first plurality of reflected light pulses, the location within the scene;
    rendering an image for presentation on the display that identifies the location in the scene as the location of the optical component; and
    presenting the scene and the image on the display.

3. The method of claim 2, wherein the image comprises one of a ring shape and a circle.

4. The method of claim 1, further comprising:
    iteratively placing the laser in a non-transmitting mode for a period of time that exceeds an interpulse interval of the pulse repetition rate during which the optical signal is not transmitted, and in a transmitting mode for a successive period of time during which the optical signal is transmitted, while concurrently depicting the scene within the FOV to the display.

5. The method of claim 1, wherein the optical signal comprises a laser having a wavelength greater than 810 nanometers(nm).

6. The method of claim 5, wherein the wavelength is in a range greater than or equal to 1350 nm and less than or equal to 1650 nm.

7. The method of claim 1, further comprising:
    scanning, by a scanning assembly, the optical signal across the FOV.

8. The method of claim 7, wherein scanning the optical signal across the FOV further comprises:
    dividing the FOV into a plurality of swaths;
    for each swath of the plurality of swaths:
        orienting the optical signal at an initial location of the each swath, and scanning the optical signal across the each swath; and
    stepping the optical signal to a next swath.

9. The method of claim 1 wherein each first integration time period has a same time duration.

10. The method of claim 1 wherein at least some of the first integration time periods have different time durations.

11. The method of claim 1, wherein the pulse repetition rate is at a rate between 9 kilohertz and 220 kilohertz.

12. The method of claim 11, wherein the detector has a frame rate between 27 hertz and 66 hertz.

13. The method of claim 1, wherein each light pulse of the plurality of light pulses has an energy in a range of 3.6 microjoules to 27.5 microjoules.

14. The method of claim 1, wherein the scene is depicted to an eyepiece via the display.

15. The method of claim 1, wherein the scene is depicted to an eyepiece via a beam splitter element that transmits energy received from the scene toward the eyepiece, and further comprising:
reflecting light from the at least one element of the display by the beam splitter element in a direction along an optical path toward the eyepiece.

16. A system for detecting an optical component comprising:
a detector having a field of view (FOV), the detector comprising a grid of a plurality of detector elements;
a laser configured to transmit an optical signal comprising a plurality of light pulses into the FOV of the detector at a pulse repetition rate;
a relay element configured to depict a scene within the FOV to a display that is registered to the FOV, the display comprising a plurality of elements that correspond to the plurality of detector elements;
wherein at least one detector element of the detector is configured to integrate a first plurality of reflected light pulses of the optical signal from a location within the scene during a plurality of successive integration time periods, the plurality of successive integration time periods varying in length; and
a controller configured to:
receive a first output signal from the detector for each successive integration time period that quantifies the first plurality of reflected light pulses received by the at least one detector element during each respective integration time period; and
alter an intensity of at least one element of the display that corresponds to the at least one detector element of the detector to different intensity levels for each successive integration time period based on the first output signal to thereby cause the at least one element of the display to increase in intensity and decrease in intensity and thereby identify the location within the scene as a location of an optical component.

17. The system of claim 16, wherein the optical signal comprises a laser having a wavelength greater than 1080 nanometers.

18. The system of claim 16, wherein the pulse repetition rate is a rate between 9 kilohertz and 220 kilohertz.

19. The system of claim 18, wherein each successive integration time period is a successive frame, and wherein the detector has a frame rate between 27 hertz and 66 hertz.

20. The system of claim 18, wherein the relay element comprises the display, and the display depicts imagery of the scene.

21. The system of claim 18, wherein the relay element comprises a beam splitter element that is communicatively coupled to the display, wherein the beam splitter element is configured to transmit energy received from an objective lens along an optical path toward an eyepiece, and to reflect light received from the display along the optical path toward the eyepiece.

22. The system of claim 16, wherein the system comprises a rifle scope.

23. The system of claim 16, wherein the system comprises binoculars.

24. A method for detecting an optical component comprising:
dividing a field of view (FOV) of a detector into a plurality of swaths, each swath corresponding to a different portion of the FOV, the detector comprising a grid of a plurality of detector elements;
scanning a laser-generated optical signal comprising a plurality of light pulses having a wavelength greater than 1080 nanometers at a pulse repetition rate across the plurality of swaths over a scan cycle time;
for each frame time period of a plurality of frame time periods that occur within the scan cycle time:
capturing, by the detector, energy from a scene within the FOV;
rendering, based on an amount of energy received by each detector element of the plurality of detector elements, an image of the scene; and
presenting the image of the scene on a display;
integrating, by at least one detector element of the plurality of detector elements, a first plurality of reflected light pulses of the laser-generated optical signal from the optical component from a location within the scene for each of a plurality of successive integration time periods of the detector; and
altering an intensity of at least one element of the display that corresponds to the at least one detector element of the plurality of detector elements to different intensity levels for each respective successive integration time period of the plurality of successive integration time periods based on a quantity of reflected light pulses received during the respective successive integration time period to thereby identify the location within the scene as a location of the optical component.

25. The method of claim 24 wherein scanning the laser-generated optical signal across the plurality of swaths comprises:
for each swath of the plurality of swaths:
orienting the laser-generated optical signal at an initial location of the swath;
scanning the laser-generated optical signal across the swath; and
stepping the laser-generated optical signal to a next swath.

* * * * *